(12) United States Patent  
Ladouceur et al.

(10) Patent No.: US 8,348,684 B2
(45) Date of Patent: Jan. 8, 2013

(54) PORTABLE ELECTRONIC DEVICE HAVING A CONCEALED JACK SOCKET

(75) Inventors: Norman Miner Ladouceur, Waterloo (CA); Jason Tyler Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 45 days.

(21) Appl. No.: 12/971,069

(22) Filed: Dec. 17, 2010

(65) Prior Publication Data

US 2012/0156901 A1 Jun. 21, 2012

(51) Int. Cl.
*H01R 13/44* (2006.01)

(52) U.S. Cl. ........................................ 439/131; 439/76.1

(58) Field of Classification Search ................ 439/76.1, 439/77, 131, 135, 136, 140–142
See application file for complete search history.

(56) References Cited

U.S. PATENT DOCUMENTS

| | | | |
|---|---|---|---|
| 4,426,558 A | 1/1984 | Tanaka et al. | |
| 4,633,048 A | 12/1986 | Komatsu | |
| 4,937,404 A | 6/1990 | Kitagawa | |
| 5,230,552 A * | 7/1993 | Schipper et al. | 312/223.6 |
| 5,634,802 A | 6/1997 | Kerklaan | |
| 5,709,156 A * | 1/1998 | Gevaert et al. | 108/50.02 |
| 5,727,972 A * | 3/1998 | Aldous et al. | 439/655 |
| 6,224,408 B1 | 5/2001 | Wu | |
| 6,290,518 B1 * | 9/2001 | Byrne | 439/131 |
| 6,561,824 B1 * | 5/2003 | Beckham et al. | 439/131 |
| 6,755,694 B2 | 6/2004 | Reis et al. | |
| 6,942,502 B2 * | 9/2005 | Sharples | 439/131 |
| 6,979,209 B2 * | 12/2005 | Griepentrog | 439/131 |
| 7,039,393 B1 | 5/2006 | Kite | |
| 7,244,129 B2 | 7/2007 | Reid et al. | |
| 7,374,437 B2 | 5/2008 | Reid et al. | |
| 7,452,220 B2 | 11/2008 | Reid et al. | |
| 7,934,932 B1 * | 5/2011 | Lee et al. | 439/31 |
| 2003/0114039 A1 | 6/2003 | Homer | |
| 2008/0064238 A1 | 3/2008 | Reid et al. | |
| 2009/0149053 A1 | 6/2009 | Chansrivong | |
| 2009/0209306 A1 | 8/2009 | Griffin | |
| 2010/0195288 A1 | 8/2010 | Byrne | |
| 2010/0215183 A1 | 8/2010 | Hansson | |

(Continued)

FOREIGN PATENT DOCUMENTS

DE 10 2008 063110 A1 7/2010

(Continued)

OTHER PUBLICATIONS

Extended European Search Report; EP 10195602.7; dated Sep. 23, 2011.

(Continued)

*Primary Examiner* — Thanh Tam Le
(74) *Attorney, Agent, or Firm* — Ridout & Maybee LLP

(57) ABSTRACT

The present disclosure provides a portable electronic device having a concealed jack socket. In accordance with one example embodiment, the portable electronic device comprises: a housing including a main body and a hatch movable between a fully open position and a fully closed position; a jack socket received within the housing, the jack socket defining a cavity for receiving a jack plug; wherein the hatch is pivotably connected to the main body to move from the fully closed position to the fully open position in response to insertion of the jack plug, wherein the jack socket is hidden in the fully closed position and exposed in the fully open position.

16 Claims, 11 Drawing Sheets

U.S. PATENT DOCUMENTS

2011/0058319 A1  3/2011  Kim et al.
2011/0508319     3/2011  Kim

FOREIGN PATENT DOCUMENTS

| EP | 1265421 | A1 | 12/2002 |
| EP | 1610420 | A2 | 12/2005 |
| EP | 2239928 | A1 | 10/2010 |
| JP | 9 326279 | | 12/1997 |
| KR | 20-2007-0000534 | U | 5/2007 |
| KR | 20070120227 | A | 12/2007 |

OTHER PUBLICATIONS

Partial European search report; EP App No. 10195602.7; Jun. 9, 2011.

Extended European Search Report, EP 10195601.9, May 31, 2011.

* cited by examiner

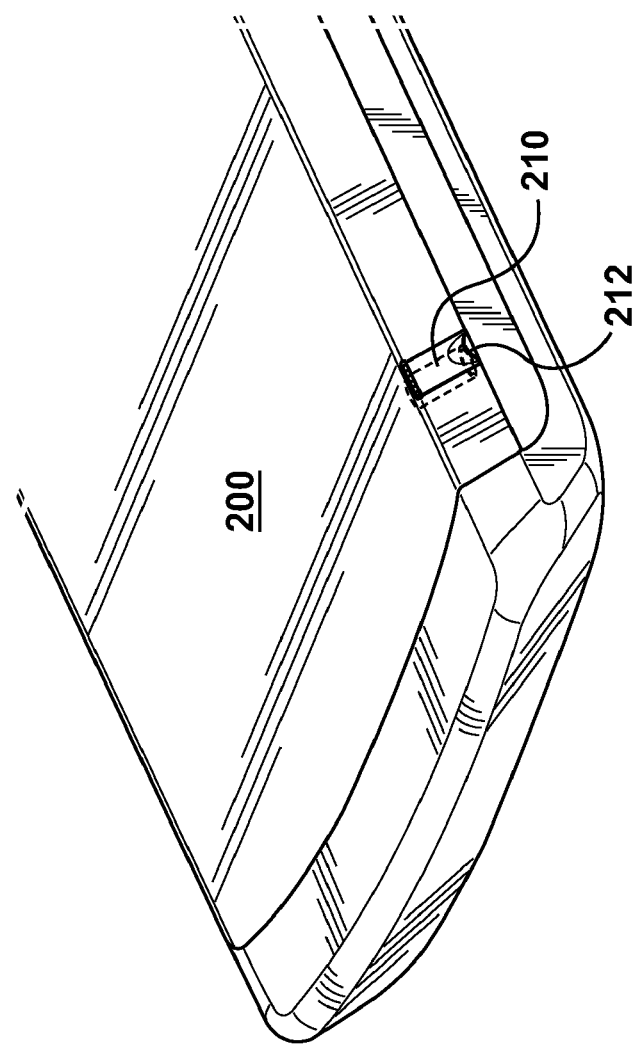

PORTABLE ELECTRONIC DEVICE HAVING A CONCEALED JACK SOCKET

TECHNICAL FIELD

The present disclosure relates to jacks, and more particularly to a portable electronic device having a concealed jack socket.

BACKGROUND

Electronic devices, including portable electronic devices, often have audio jacks for receiving an audio plug of an audio accessory such as headphones, a headset, amplified speakers or amplified headphones. Audio jacks can be relatively large compared with other components of portable electronic devices and contribute to the thickness of host portable electronic devices in which the audio jacks are carried. Accordingly, alternative audio jacks which reduce the thickness of host portable electronic devices are desirable.

BRIEF DESCRIPTION OF THE DRAWINGS

FIG. 3A is a partial perspective view of a portable electronic device having a concealed jack socket in accordance with one embodiment of the present disclosure with the jack socket in a fully retracted position and hidden;

DETAILED DESCRIPTION OF EXAMPLE EMBODIMENTS

Figure 1:
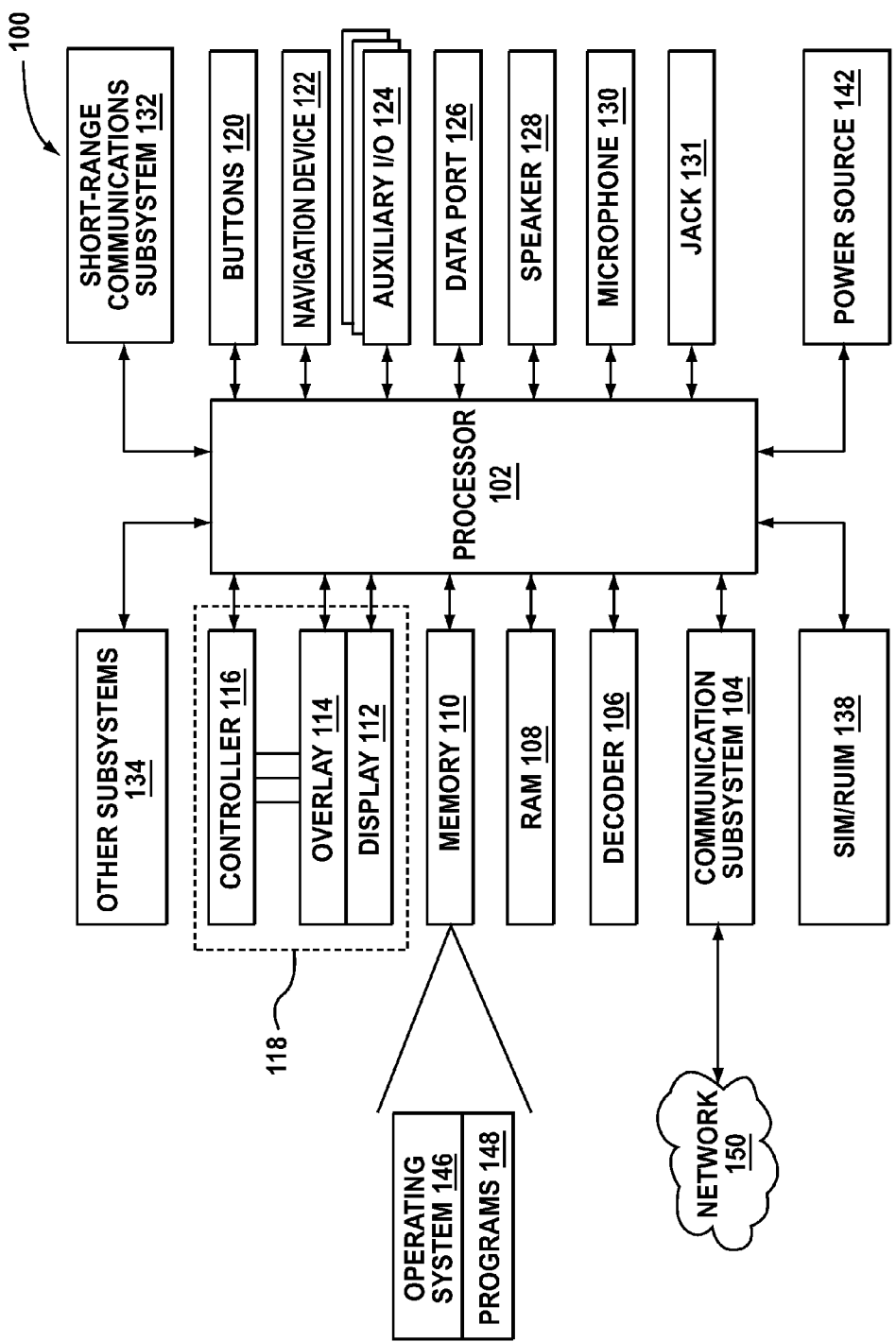
FIG. 1 is a simplified block diagram of components including internal components of a portable electronic device suitable for carrying out the example embodiments of the present disclosure.

The present disclosure generally relates to portable electronic devices which may be carried in a user's hands (i.e., handheld electronic devices) or may be moved or shaken by the user. Examples of portable electronic devices include, but are not limited to, pagers, mobile phones, smartphones, wireless organizers, PDAs, portable media players, portable gaming devices, Global Positioning System (GPS) navigation devices, electronic book readers, cameras, and notebook and tablet computers. Example embodiments of the present disclosure may be applied to other portable electronic devices not specifically described in the above examples.

In accordance with one example embodiment, there is provided a portable electronic device comprising: a housing including a main body and a hatch movable between a fully closed position and a fully open position; a jack socket received within the housing, the jack socket defining a cavity for receiving a jack plug; wherein the hatch is pivotably connected to the main body to move from the fully closed position to the fully open position in response to insertion of the jack plug, wherein the jack socket is hidden in the fully closed position and exposed in the fully open position.

In accordance with another example embodiment, there is provided a portable electronic device comprising: a flexible casing formed of a flexible material defining an aperture; a jack socket received within the flexible casing, the jack socket defining a cavity aligned with the aperture for receiving a jack plug in the flexible casing; wherein the jack socket is slideable between a fully retracted position and a fully extended position in response to insertion of the jack plug.

In accordance with a further example embodiment, there is provided a portable electronic device comprising: a flexible casing formed of a flexible material defining an aperture; a jack socket attached to an inside surface of flexible casing, the jack socket defining a cavity aligned with the aperture for receiving a jack plug in the flexible casing; wherein the jack socket is rotatable between a first position and second position in response to insertion of the jack plug.

Reference will now be made to the accompanying drawings which show, by way of example, example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

Reference is made to FIG. 1, which illustrates in block diagram form, a portable electronic device 100 to which example embodiments described in the present disclosure can be applied. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 (such as a liquid crystal display (LCD)) with a touch-sensitive overlay 114 coupled to an electronic controller 116 that together comprise a touch-sensitive display 118, one or more keys or buttons 120, a navigation device 122, one or more auxiliary input/output (I/O) subsystems 124, a data port 126, a speaker 128, a microphone 130, a jack 131, a short-range communications subsystem 132, and other device subsystems 134. It will be appreciated that the electronic controller 116 of the touch-sensitive display 118 need not be physically integrated with the touch-sensitive overlay 114 and display 112. User-interaction with a graphical user interface (GUI) is performed through the touch-sensitive overlay 114. The GUI displays user interface screens on the touch-sensitive display 118 for displaying information or providing a touch-sensitive onscreen user interface element for receiving input. This content of the user interface screen varies depending on the device state and active application, among other factors. Some user interface screens may include a text field sometimes called a text input field. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102.

The jack 131 may be an audio jack for receiving an audio plug of an audio accessory such as, for example, headphones, a headset, amplified speakers or amplified headphones. Alternatively, the jack 131 may be configured for receiving jack plugs for other accessories or auxiliary I/O devices. The other accessories may include, for example, a multimedia accessory having multimedia inputs such as play, pause, stop, forward/rewind inputs, or a video output accessory that allows for connection of the portable electronic device 100 to a display such as television (TV) or monitor. Alternatively, the jack 131 may be a Universal Serial Bus (USB) port, FireWire port, RJ-11 port, RJ-45 port, memory card reader port for an SD card or other memory card, or other data port.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146, software applications (or programs) 148 that are executed by the processor 102, and data which are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data objects, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
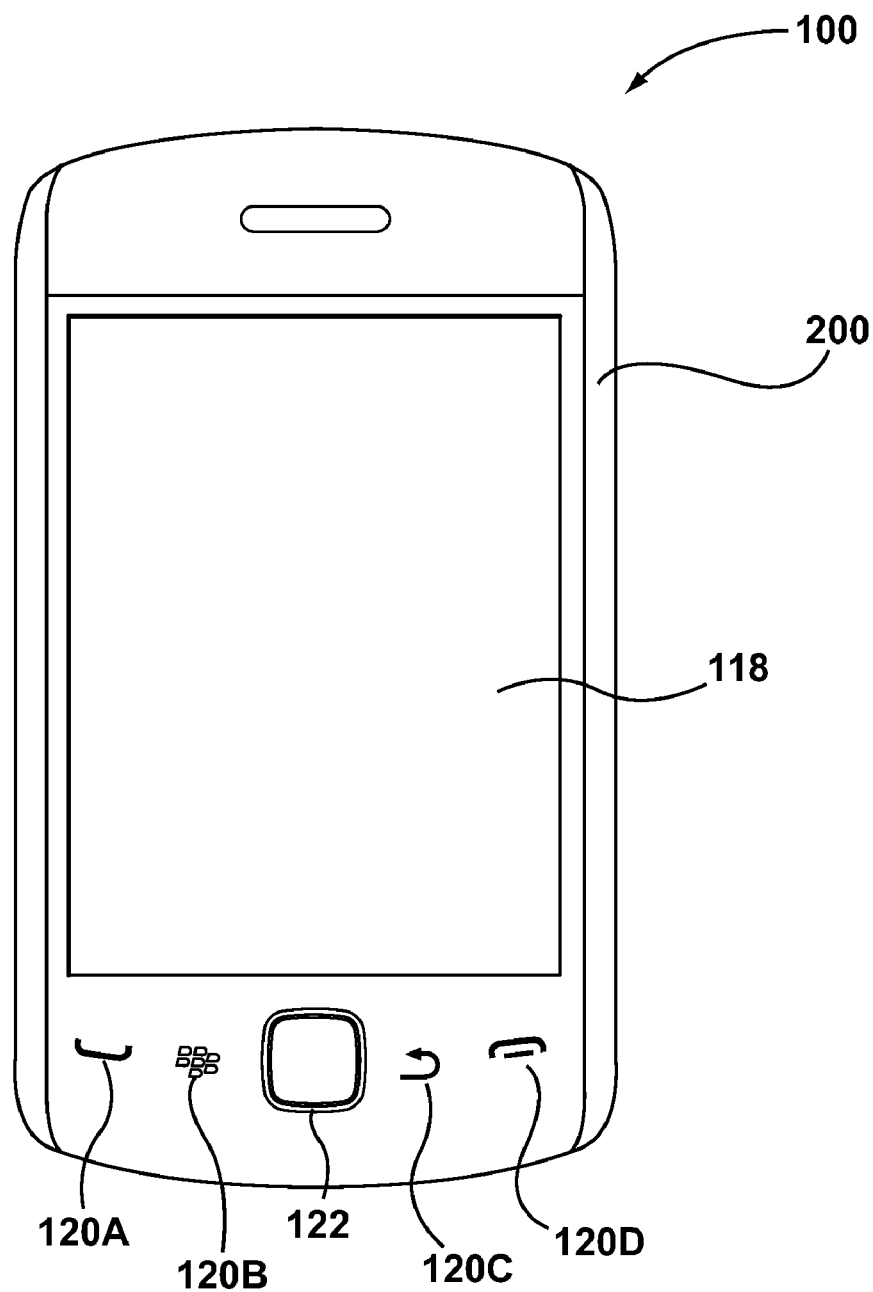
FIG. 2 is a front view of an example of a portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The buttons 120, represented individually by references 120A, 120B, 120C and 120D, are located below the touch-sensitive display 118 on a front face of the portable electronic device 100. The buttons 120 generate corresponding input signals when activated. The buttons 120 may be constructed using any suitable button (or key) construction such as, for example, a dome-switch construction. The actions performed by the device 100 in response to activation of respective buttons 120 are context-sensitive. The action performed depends on a context that the button was activated. The context may be, but is not limited to, a device state, application, screen context, selected item or function, or any combination thereof.

The navigation device 122 may be a depressible (or clickable) joystick such as a depressible optical joystick, a depressible trackball, a depressible scroll wheel, or a depressible touch-sensitive trackpad or touchpad. FIG. 2 shows the navigation device 122 in the form of a depressible optical joystick.

The auxiliary I/O subsystems 124 may include other input devices such as a keyboard and/or keypad (neither of which is not shown). In other example embodiments, a conventional a non-touch-sensitive display, such as an LCD, may be provided instead of the touch-sensitive display 118 along with a keyboard and/or keypad.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Figure 3B:
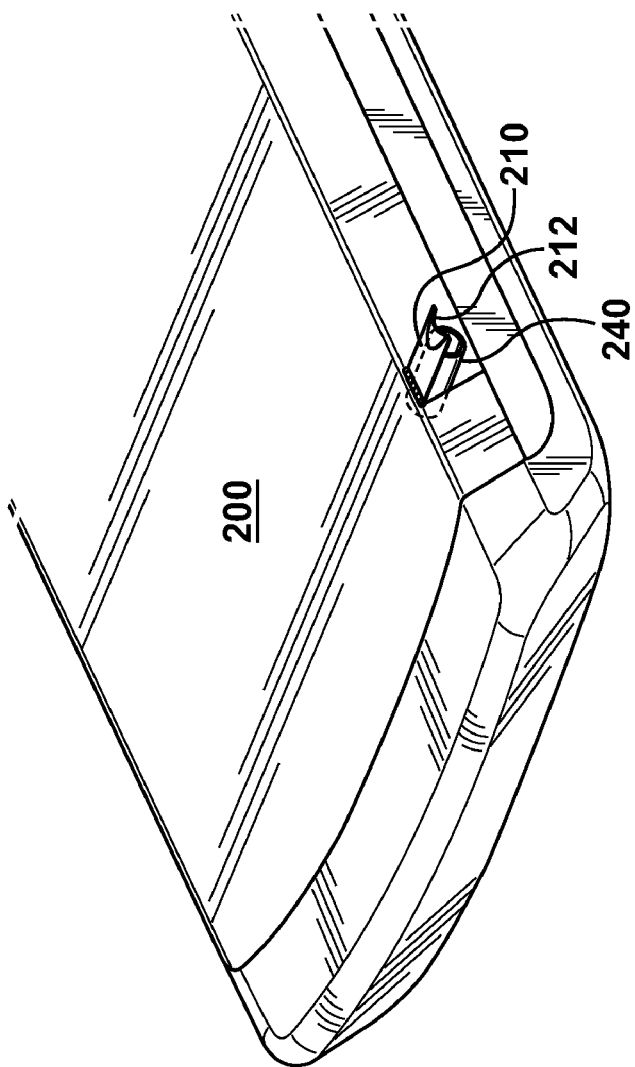
FIG. 3B is a partial perspective view of the portable electronic device of FIG. 3A with the jack socket in a fully extended position and exposed.

FIGS. 3A and 3B illustrate one example of the portable electronic device 100 having a concealed jack socket 240 in accordance with one embodiment of the present disclosure. The jack socket 240 may be used to provide the jack 131 of the portable electronic device 100 described above. The housing 200 includes a rigid main body and a rigid hatch 210 movable within a range between a fully closed position (FIG. 3A) and a fully open position (FIG. 3B). The jack socket 240 is movable within a range between a fully retracted position when the hatch 210 is closed (FIG. 3A) and a fully extended position (or "rotated position") when the hatch 210 is open (FIG. 3B). The hatch 210 has a flared portion 212 which defines an aperture (also known as a pick window) for catching a tip of a jack plug during insertion.

Figure 4A:
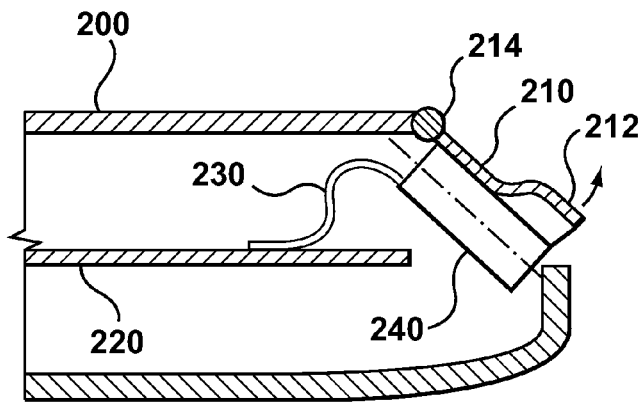
FIG. 4A is a partial sectional view of the portable electronic device of FIG. 3A with the jack socket in the fully retracted position.
Figure 4B:
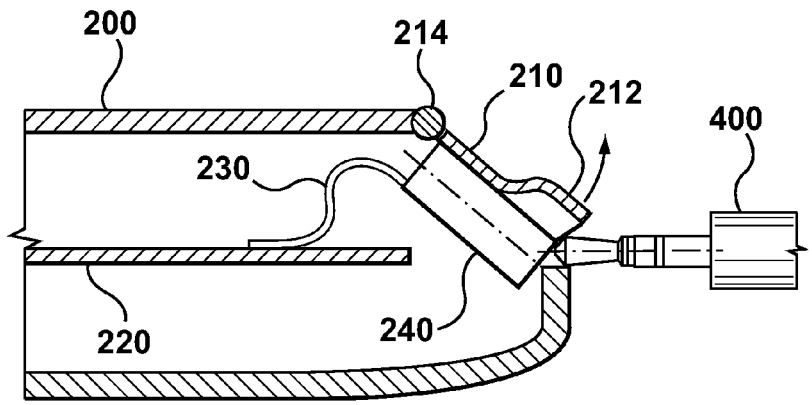
FIG. 4B is a partial sectional view of the portable electronic device of FIG. 4A with the jack socket in between the fully retracted position and the fully extended position.
Figure 4C:
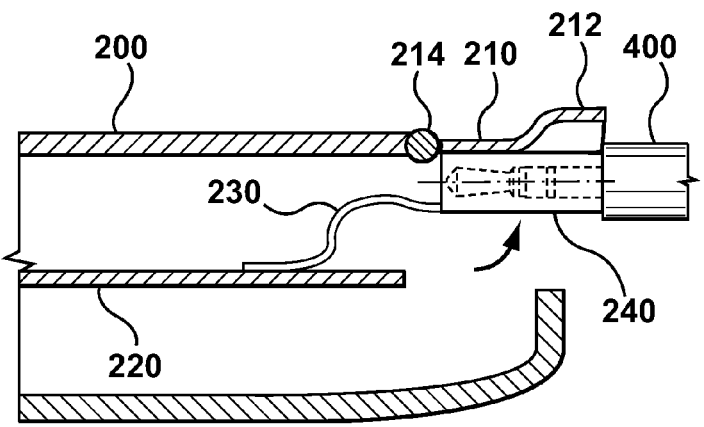
FIG. 4C is a partial sectional view of the portable electronic device of FIG. 4A in the fully extended position.

FIGS. 4A to 4C show the jack socket 240 in greater detail. In FIG. 4A, the jack socket 240 is in the fully retracted position. In FIG. 4B, the jack socket 240 is in between the fully retracted position and the fully extended position. In FIG. 4C, the jack socket 240 is in the fully extended position. The jack socket 240 is received within the housing 200. The jack socket 240 defines a cavity for receiving a jack plug 400, such as an audio plug, when the jack socket 240 is in the fully extended position. The cavity has an aperture and extends along a longitudinal axis of the jack socket 240. The cavity, in the shown example, is shaped to accommodate an inserted jack plug of the TRS ("tip-ring-sleeve"), TRRS ("tip-ring-ring-sleeve") or TS ("tip-sleeve") variety. The shape of the cavity is substantially complementary to the shape of the jack plug 400.

The jack socket 240 includes a body and at least one electrical contact having a contact surface exposed within the cavity for interfacing with an inserted jack plug 400. The electrical contact is adapted to electrically communicate with corresponding contacts of the inserted jack plug. The electrical contact may be a spring contact. The electrical contact is connected to a circuit board 220 of the portable electronic device 100 which, for example, may be a rigid printed circuit board (PCB) or a flexible PCB attached to a stiffener or substrate. The processor 102 is typically attached to the circuit board 220. The circuit board 220 may be attached to a frame (not shown) which provides an internal structure of the portable electronic device 100. In the shown example, a flexible PCB 230 connects the electrical contact to the circuit board 220. In at least some examples, the body of the jack socket 240 is made of a rigid plastic such as, for example, a suitable polycarbonate plastic. The electrical contact is made of a suitable electrically conducting material such as, for example, gold.

The example jack plug 400 shown in FIGS. 4B and 4C is an audio plug. The jack plug 400 includes a number of electrical contacts for establishing electrical communication with the electrical contacts in the cavity of the jack socket 240. The electrical contacts of the jack plug 400 may be used for a variety of electrical connections with the jack socket 240 depending on the type of jack plug with which it is to be use, such as a mono audio signal or stereo audio signals, a microphone signal, and a ground. In the shown example, the jack plug 400 is of a TRS type having a cylindrical sleeve separated by insulating rings to provide three separate electrical contacts at the tip, ring, and sleeve. The electrical contact closest to the base of the jack plug 400 is the sleeve contact. The sleeve contact is separated by a first insulating ring from the ring contact, which is in turn separated by a second insulating ring from the tip contact at the distal end of the jack plug 400.

In the example described above, the sleeve contact is in electrical communication with a first electrical contact in the cavity of the jack socket 240 when the jack plug 400 is fully inserted, the ring contact is in electrical communication with a second electrical contact in the cavity when the jack plug 400 is fully inserted, and the tip contact is in electrical communication with a third electrical contact in the cavity when the jack plug 400 is fully inserted. This provides an electrical communication path between the jack socket 240 and the jack plug 400.

In some embodiments, the different plug contacts may carry various audio signals, including speaker or headphone audio signals and/or microphone audio signals. When the jack plug 400 is a stereo audio plug, the tip contact may carry a left channel audio signal, the ring contact may carry a right channel audio signal, and the sleeve contact may serve as a grounding contact connecting the jack plug 400 to a system ground or separate audio ground for the portable electronic device 100.

In the shown example, a rear end of the jack socket 240 provides a detent or stop for an inserted jack plug. The rear end resists forward movement of a jack plug inserted along the longitudinal axis of the cavity. The detent or stop is provided by a chamfered rear end of the cavity having a shape complementary to the tip of the jack plug 400. When the tip of the jack plug 400 comes into contact with the rear end of the cavity, any further force of insertion along the longitudinal axis of the cavity is resisted.

The hatch 210 is pivotably connected to the main body of the housing 200 such that the hatch 210 moves between the fully closed position and the fully open position in response to insertion of the jack plug 400. In the shown example, a hinge 214 pivotably connects the hatch 210 to the main body such that the hatch 210 rotates from the fully closed position to the fully open position in response to insertion of the jack plug. In the shown embodiment, the jack socket 240 is attached to an inside surface of the hatch 210 for moving the hatch 210 between the fully closed position and fully open position. The jack socket 240 may be attached to the hatch 210 using, for example, a suitable adhesive. The flared portion 212 of the hatch 210 which defines a pick window for catching a tip of the jack plug 400 during insertion. A detent or stop (not shown) may stop the hatch 210 from falling into the interior of the portable electronic device 100. The detent or stop (not shown) may be, for example, part of housing 200 or frame of the portable electronic device 100.

The operation of the concealed jack socket 240 in the above-described embodiment will now be explained with reference to FIGS. 4A to 4C. When a jack plug 400 is inserted into the jack socket 240, the tip of the jack plug 400 catches the aperture formed by the flared portion of the hatch 210 as shown in FIG. 4B. As insertion of the jack plug 400 continues, the tip of the jack plug 400 causes the hatch 210 to move from its fully closed position shown in FIG. 4A towards its fully open position shown in FIG. 4C. As shown in FIG. 4B, the hatch 210 moves upwards and exposes at least a part of the interior of the portable electronic device 100 in response to insertion of the plug.

As insertion of the jack plug 400 continues further, the tip of the jack plug 400 enters the aperture in the housing 200 provided by the flared portion and the hatch 210 continues to rotate upwards. As the hatch 210 moves upwards, the aperture of the jack socket 240 becomes exposed. As insertion of the jack plug 400 continues, the tip of the jack plug 400 enters the aperture in the jack socket 240 attached to the inside surface of the hatch 210. The hatch 210 continues to rotate upwards until it reaches the fully open position. Typically the hatch 210 reaches the fully open position when the tip of the jack plug 400 abuts the chambered rear end of the jack socket 240.

When the jack plug 400 is removed from the jack socket 240, the jack socket 240, the hatch 210 moves forward towards the fully closed position, possibly assisted by biasing means, until the hatch 310 reaches the fully closed position.

In the shown embodiment, the hatch 210 is substantially parallel with a front face of the housing 200 when in the fully open position. A detent or stop (not shown) may prevent further movement of the hatch 210, beyond the fully open position, after the tip of the jack plug 400 abuts the chambered rear end of the jack socket.

Figure 5A:
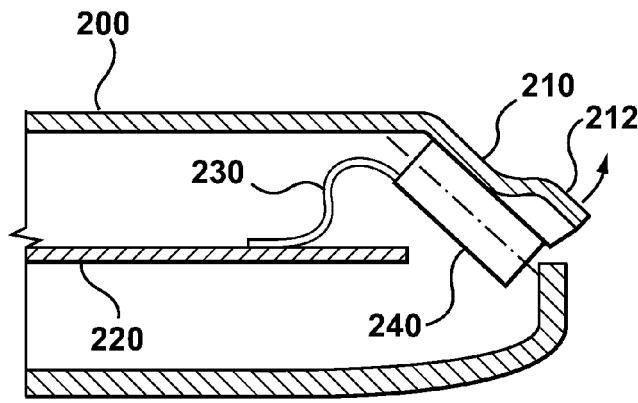
FIG. 5A is a partial sectional view of another embodiment of the portable electronic device with the jack socket in the fully retracted position.
Figure 5B:
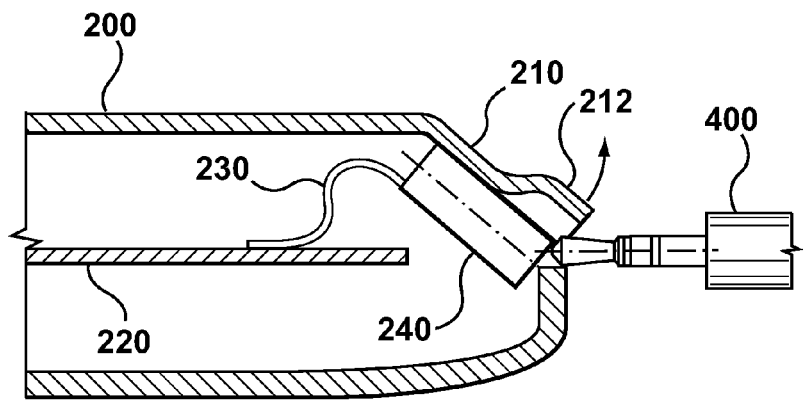
FIG. 5B is a partial sectional view of the portable electronic device of FIG. 5A with the jack socket in between the fully retracted position and the fully extended position.
Figure 5C:
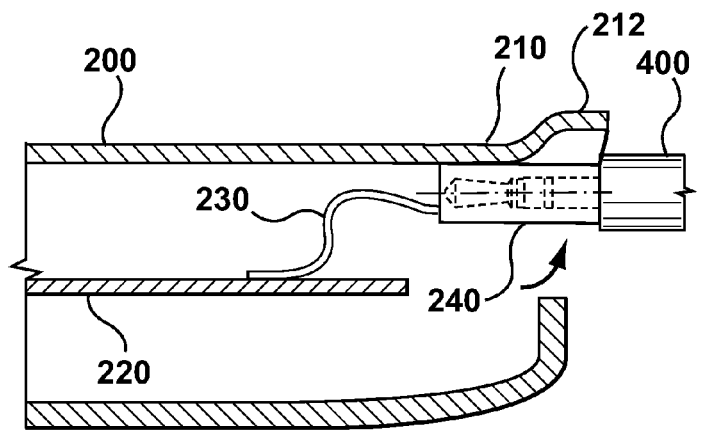
FIG. 5C is a partial sectional view of the portable electronic device of FIG. 5A in the fully extended position.

FIGS. 5A to 5C illustrate an alternate embodiment of the portable electronic device shown in FIGS. 4A to 4C. The embodiment of FIGS. 5A to 5C is similar to the embodiment of FIGS. 4A to 4C except that, rather than a rigid main body and hatch 210, the main body and hatch 210 are formed of a flexible material so as to form a flexible casing. The flexible material may be any flexible suitable material including, but not limited to, a suitable urethane, neoprene or silicone rubber. The hinge 214 is replaced with a flexible bend which resiliently bends in response to movements of the jack socket 240. The flexible casing defines an aperture which is aligned with the cavity of the jack socket. The jack socket 240 is rotatable between a first position and second position in response to insertion of the jack plug similar to the fully closed position and fully open position of the hatch 210 in FIGS. 4A to 4C.

In yet another embodiment, a flexible casing formed of a flexible material may overlay the housing 200 and the hatch 210. Again, the flexible material may be any flexible suitable material including, but not limited to, a suitable urethane, neoprene or silicone rubber. The flexible casing may apply an inwardly biasing (or restraining) force on the hatch 210 which biases or "pre-loads" the hatch 210 into the fully closed position and releasably secures an inserted jack plug 400.

Figure 6A:
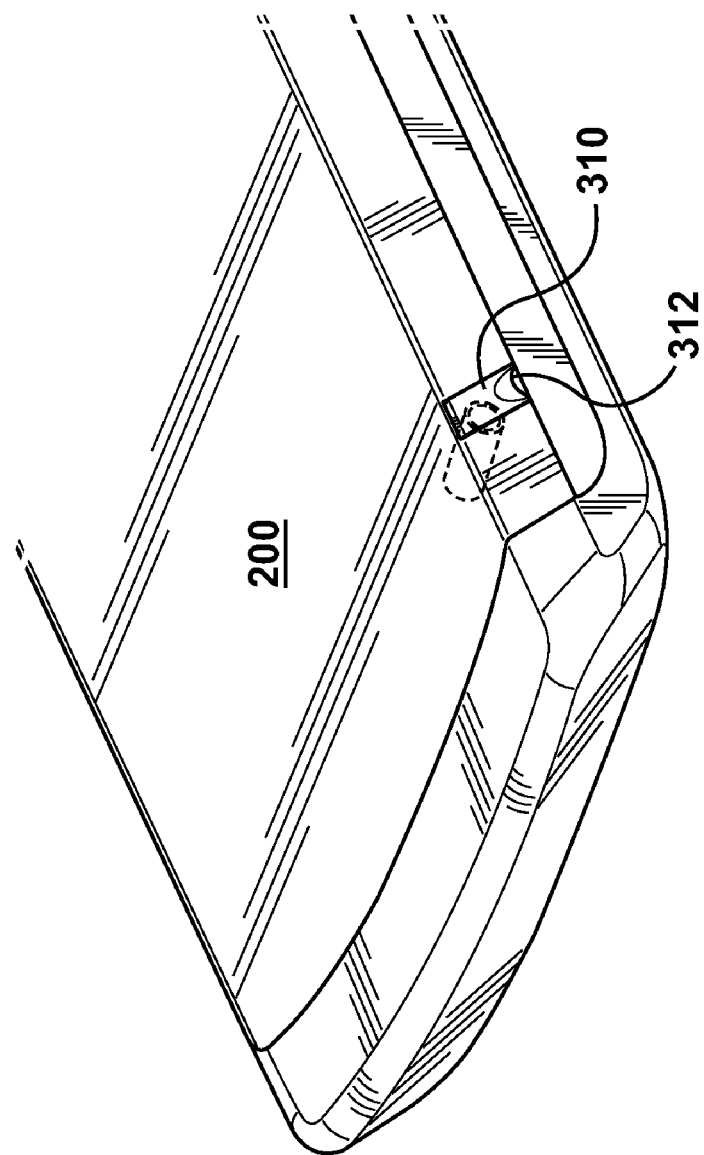
FIG. 6A is a partial perspective view of a portable electronic device having a concealed jack socket in accordance with another embodiment of the present disclosure with the jack socket in a fully retracted position and hidden.
Figure 6B:
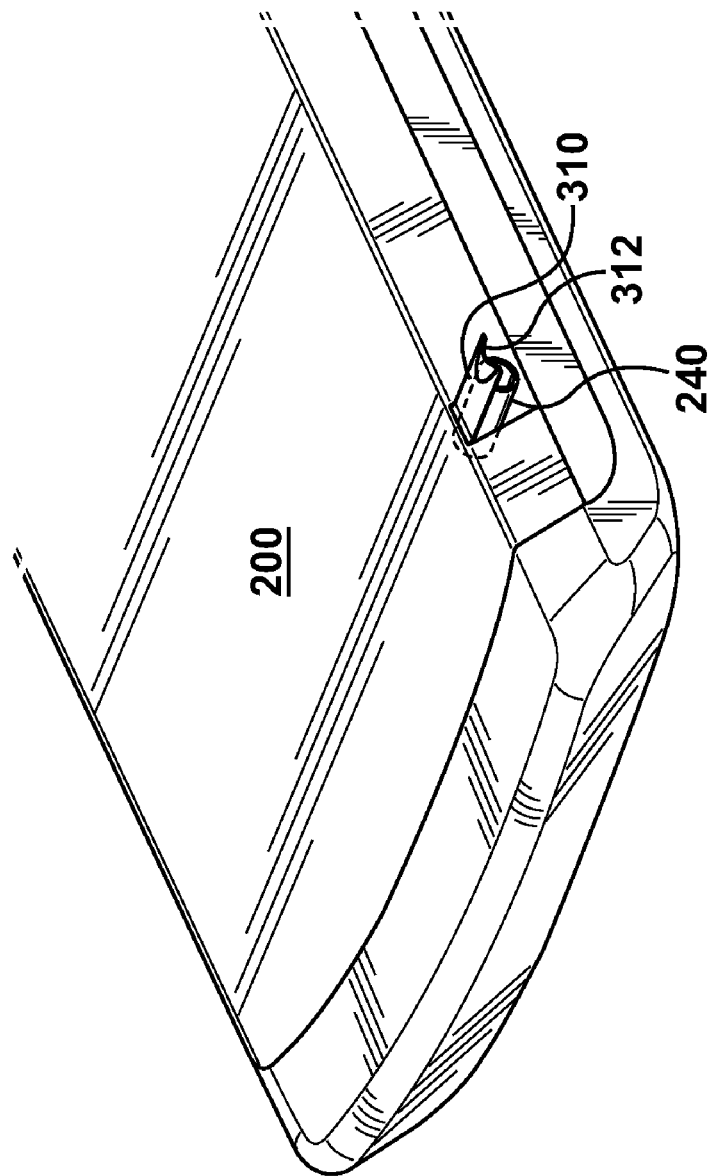
FIG. 6B is a partial perspective view of the portable electronic device of FIG. 6A with the jack socket in a fully extended position and exposed.
Figure 6C:
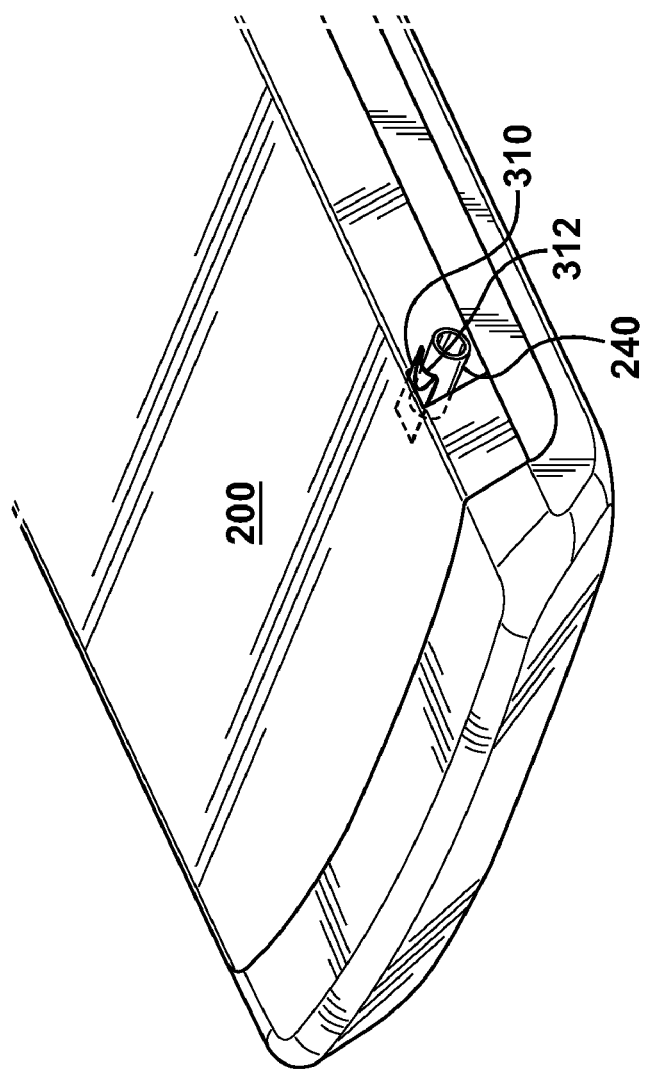
FIG. 6C is a partial perspective view of the portable electronic device of FIG. 6A with the jack socket in a partially extended position and partially exposed.

FIGS. 6A and 6B illustrate another example of the portable electronic device 100 having a concealed jack socket 240 in accordance with another embodiment of the present disclosure. The housing 200 includes a rigid main body and a rigid hatch 310 movable within a range between a fully closed position (FIG. 6A), a first open position (FIG. 6B) and a fully open position (not shown). The jack socket 240 is movable within a range between a fully retracted position and a fully extended position. The embodiment of FIGS. 6A and 6B is similar to the embodiments described above except that the jack socket 240 slides rather than rotates. The hatch 310 has a flared portion 312.

Figure 7A:
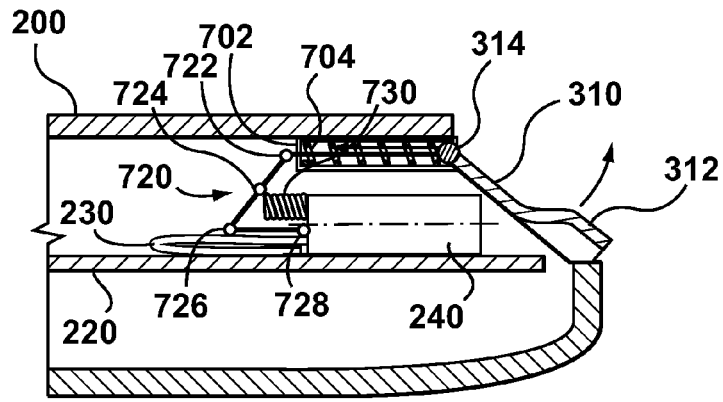
FIG. 7A is a partial sectional view of the portable electronic device of FIG. 6A with the jack socket in the fully retracted position.
Figure 7B:
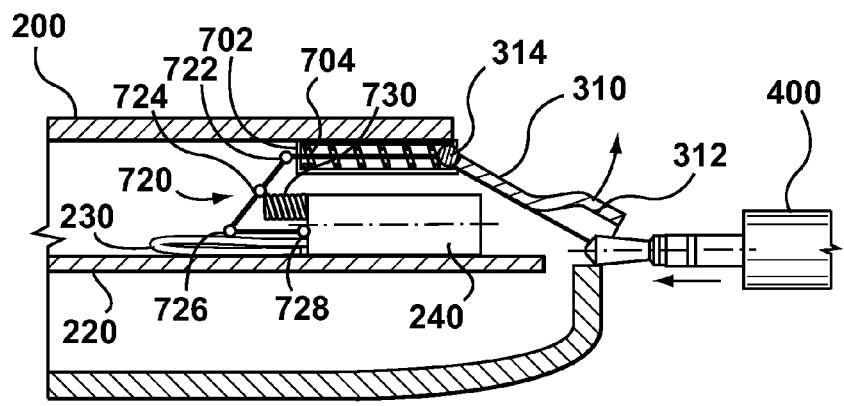
FIG. 7B is a partial sectional view of the portable electronic device of FIG. 6A with the jack socket in between the fully retracted position and the fully extended position.
Figure 7C:
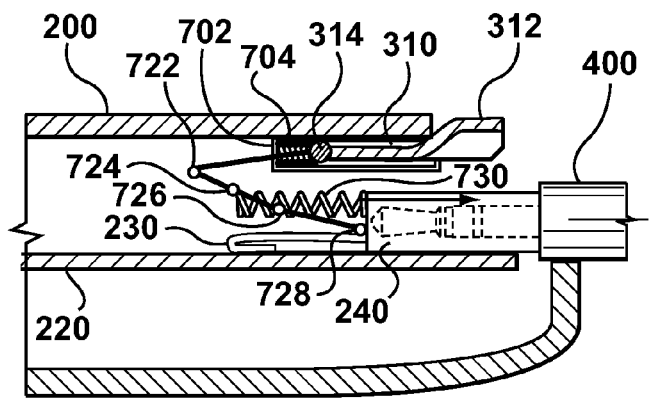
FIG. 7C is a partial sectional view of the portable electronic device of FIG. 6A in the fully extended position.

FIGS. 7A to 7C show one embodiment of a sliding mechanism for sliding the jack socket 240 between the fully retracted position and fully extended position. The jack socket 240 is the same as described above. The hatch 310 is pivotably connected to the main body of the housing 200 such that the hatch 310 moves between the fully closed position and the first open position in response to insertion of the jack plug 400. The sliding mechanism also permits sliding movement of the hatch 310 between the first open position and a fully open position in response to insertion of the jack plug 400, as described in more detail below.

In the shown example, a hinge 314 pivotably connects the hatch 310 to the main body such that the hatch 310 rotates between the fully closed position and the first open position in response to insertion of the jack plug 400. The flared portion 312 of the hatch 310 which defines a pick window for catching a tip of the jack plug 400 during insertion. A detent or stop (not shown) may stop the hatch 310 from falling into the interior of the portable electronic device 100. The detent or stop (not shown) may be, for example, part of housing 200 or frame of the portable electronic device 100.

The area of the PCB 220 proximate to the jack socket 240 provides a sliding surface which facilitates the sliding movement of the jack socket 240 between the fully retracted position and the fully extended position. The sliding surface is substantially free of device components, solder points or other obstructions. The sliding surface may have a low friction surface provided, for example, by a low friction material (such as a coating) on the PCB 220 in the area of the PCB 220 proximate to the jack socket 240. The PCB 220 may have a spring contact (not shown) located towards the hatch 310 for engaging the electrical contact of the jack socket 240 when in the fully extended position. The spring contact may be surface mounted (e.g., soldered) to the PCB 220 for engaging the jack socket 240 when it moves into the fully extended position. When the jack socket 240 moves back from the fully extended position and towards the fully retracted position, the jack socket 240 disengages from the spring contact. This may reduce the likelihood of electrostatic discharge (ESD) in some embodiments.

The sliding mechanism comprises a track 702 which receives the ends of the hinge 314 for sliding movement thereon. The ends of the hinge 314 may be received, for example, in flanged bushings which are received in and travel along the track 702 between its respective ends. The hatch 310 slides between the first open position and the fully open position in response to insertion of the jack plug 400.

The sliding mechanism comprises also includes a linkage system 720 which is connected to the hatch 310 and the jack socket 240 such that the jack socket 204 moves from the fully retracted position when the hatch 310 is in the first open position to the fully extended position when the hatch 310 is in the fully open position. In the shown example, the linkage system 720 includes four link links having joints 722, 724, 726 and 728. A first link at one end of the linkage system 720 is connected to the hinge 314. A fourth link at the opposite end of the linkage system 720 is connected to the rear end of the jack socket 240. Intermediate linkages connect the first link and fourth link. In the shown example, the joint 724 is fixed to a fixed point of the housing 200.

In the shown example, the sliding mechanism further comprises a first biasing mechanism, such as a spring 730, urges the jack socket 240 from the fully retracted position to the fully extended position, and a second biasing mechanism, such as a spring 704, urges the hatch 310 into the fully closed position. A switching mechanism (not shown) may be provided for use with the biasing mechanisms. The switching mechanism is adapted to engage the first biasing mechanism to urge the jack socket 240 from the fully retracted position to the fully extended position and disengage the second biasing mechanism during insertion of the jack plug 400 into the jack socket 240. The switching mechanism is further adapted to engage the second biasing mechanism to urge the hatch 310 into the fully closed position and disengage the first biasing mechanism during removal of the jack plug 400 from the jack socket 240. The switching mechanism may operate by disengaging and engaging stops or locks of the biasing mechanisms as necessary. For example, spring-loaded stops may be overcome with a sufficient force during the insertion or removal of the jack plug 400 from the jack socket 240. Other biasing mechanisms may be used in other embodiments.

A sensor (not shown) may be used to sense the insertion of the jack plug 400 into the jack socket 240 and sense the removal of the jack plug 400 from the jack socket 240. The sensor may be any suitable type of sensor such as, for example, a motion sensor or suitably located contact switch(es) which contact the jack socket 240 during travel. The sensor may be connected to the switching mechanism which engages and disengages the biasing mechanisms in accordance with whether the jack plug 400 is being inserted or removed from the jack socket 240.

In other embodiments, an electric motor (not shown) is used for moving the jack socket 240 between the fully retracted position and the fully extended position instead of the first biasing mechanism, e.g. spring 730. The motor is connected between the jack socket 240 and a fixed point of the portable electronic device 100. The motor has at least two modes of operation: a first mode which moves the jack socket 240 from the fully retracted position to the fully extended position during insertion of the jack plug 400 into the jack socket 240; and a second mode which moves the jack socket 240 from the fully extended position to the fully retracted position during removal of the jack plug 400 from the jack socket.

The motor is controlled by a controller (not shown), which in various embodiments may include hardware circuitry components (including integrated circuits and/or wired circuitry), firmware circuitry components, software components stored on the portable electronic device 100 and executable by processor 102 or a separate device processor, and/or various combinations of the forgoing components. The motor includes a portion (for example, a motor housing assembly containing an armature assembly) fixed to the jack socket 240 and a fixed point on the housing 200 or a frame (not shown) to which the housing 200 is attached. The motor may be linked to jack socket 240, for example, by one or more gears and/or cams to a drive shaft of the motor armature assembly.

A switching mechanism (not shown) may be provided for use with the motor. The switching mechanism is adapted to cause the motor to move the jack socket 240 from the fully retracted position to the fully extended position during insertion of the jack plug 400 into the jack socket 240, and cause the motor to move the jack socket 240 from the fully extended position to the fully retracted position during removal of the jack plug 400 from the jack socket 240. A sensor (not shown) may be used to sense the insertion of the jack plug 400 into the jack socket 240 and sense the removal of the jack plug 400 from the jack socket 240. The sensor may be any suitable type of sensor such as, for example, a motion sensor or suitably located contact switch(es) which contact the jack socket during travel. The sensor may be connected to the switching mechanism which activates the motor and changes the mode of operation of the motor in accordance with whether the jack plug 400 is being inserted or removed from the jack socket 240.

The operation of the concealed jack socket 240 in the above-described embodiment will now be explained with reference to FIGS. 7A to 7C. When a jack plug 400 is inserted into the jack socket 240, the tip of the jack plug 400 catches the aperture formed by the flared portion of the hatch 310 as shown in FIG. 7B. As insertion of the jack plug 400 continues, the tip of the jack plug 400 causes the hatch 310 to act against the second biasing mechanism, such as the spring 704, and move the hatch 310 from its first open position towards the fully open position. As shown in FIG. 7B, the hatch 310 moves upwards and exposes at least a part of the interior of the portable electronic device 100 in response to insertion of the plug.

As insertion of the jack plug 400 continues further, the tip of the jack plug 400 enters the aperture in the housing 200 provided by the flared portion and the hatch 310 continues to rotate upwards. When the hatch 310 reaches its first open position, it slides or otherwise moves backwards from its first open position towards the fully open position (FIG. 7C). As the hatch 310 moves backwards towards the fully open position, the jack socket 240 moves forward from its fully retracted position towards its fully extended position and the approaching jack plug 400. The linkage system 720, or cable system 820 described below, coordinate the movements of the jack socket 240 and hatch 310 such that the jack socket 240 moves from the fully retracted position to the fully extended position when the hatch 310 moves from the first open position to the fully open position and vice versa. The jack socket 240 may be urged forward by the first biasing mechanism, such as the spring 730, or moved forward by a motor as described above.

As insertion of the jack plug 400 continues further, the tip of the jack plug 400 enters the aperture of the approaching jack socket 240. The hatch 310 continues to move backwards until it reaches the fully open position. Typically the hatch 310 reaches the fully open position when the jack socket 240 reaches the fully extended position. The jack plug 400 is fully inserted when the tip of the jack plug 400 abuts the chambered rear end of the jack socket 240. A detent or stop (not shown) may releasably secure the jack socket 240 in the fully extended position.

When the jack plug 400 is removed from the jack socket 240, the jack socket 240 moves backwards from its fully extended position towards its fully retracted position. As the jack socket 240 moves backwards towards its fully retracted position, the hatch 310 moves forward from the fully open position towards the first open position. Typically the hatch 310 reaches the fully open position when the jack socket 240 reaches the fully retracted position. As noted above, the linkage system 720, or cable system 820 described below, coordinate the movements of the jack socket 240 and hatch 310 such that the jack socket 240 moves from the fully extended position to the fully retracted position when the hatch 310 moves from the fully open position to the first open position and vice versa. As removal of the jack plug 400 continues, the hatch 310 moves from the first open position towards the fully closed position, possibly assisted by biasing means such as the spring 704, until the hatch 310 reaches the fully closed position (FIG. 7A).

Figure 8A:
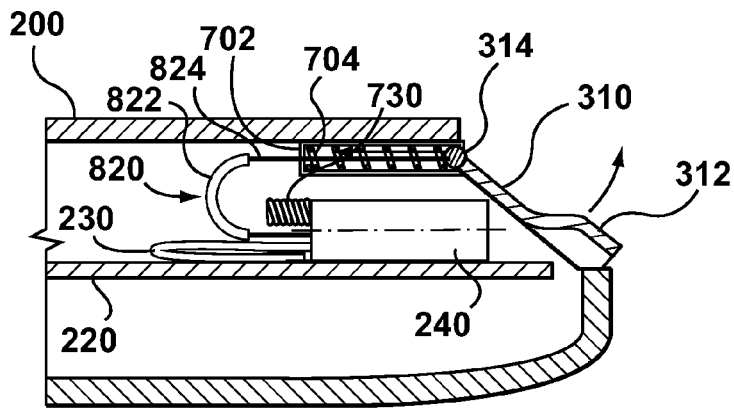
FIG. 8A is a partial sectional view of another embodiment of the portable electronic device with the jack socket in the fully retracted position.
Figure 8B:
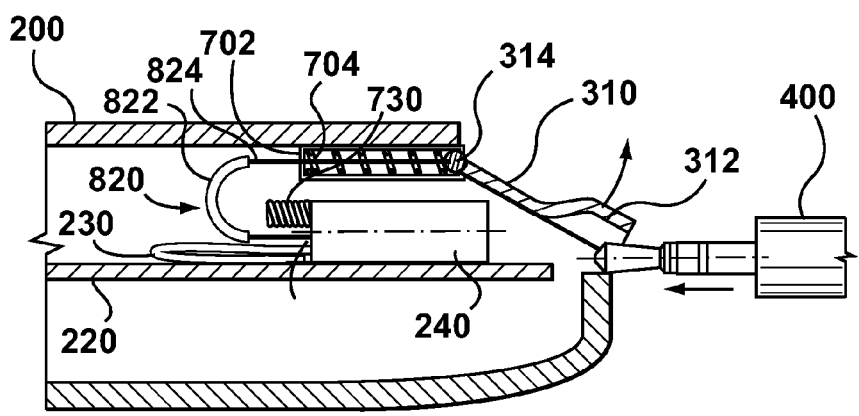
FIG. 8B is a partial sectional view of the portable electronic device of FIG. 8A with the jack socket in between the fully retracted position and the fully extended position.
Figure 8C:
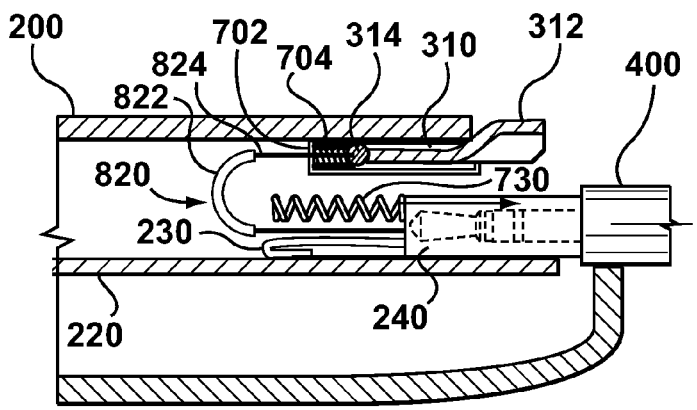
FIG. 8C is a partial sectional view of the portable electronic device of FIG. 8A in the fully extended position.

FIGS. 8A to 8C show another embodiment of a sliding mechanism for sliding the jack socket 240 between the fully retracted position and fully extended position. The embodiment of FIGS. 8A to 8C is similar to the embodiment of FIGS.

7A to 7C described above except that the linkage system 720 is replaced with a cable system 820 connecting the hatch 310 and the jack socket 240 such that the jack socket 240 moves from the fully retracted position when the hatch 310 is in the first open position to the fully extended position when the hatch 310 is in the fully open position. The cable system 820 includes a cable sleeve 822 and a cable 824 extending through the cable sleeve 822. The cable 824 connects the hatch 310 to the jack socket 240. The cable sleeve 822 is attached to a fixed point of the housing 200 similar to the joint 724 in the linkage system 720.

In other embodiments, rather than a rigid main body and hatch 310, the main body and hatch 310 may be formed of a flexible material so as to form a flexible casing. The flexible material may be any flexible suitable material including, but not limited to, a suitable urethane, neoprene or silicone rubber. The hinge 314 is replaced with a flexible bend which resiliently bends in response to movements of the jack socket 240. The flexible casing defines an aperture which is aligned with the cavity of the jack socket. The jack socket 240 is slideable between the fully retracted and fully extended position in response to insertion of the jack plug as described above.

In yet other embodiments, a flexible casing formed of a flexible material may overlay the housing 200 and the hatch 310. Again, the flexible material may be any flexible suitable material including, but not limited to, a suitable urethane, neoprene or silicone rubber. The flexible casing may apply an inwardly biasing (or restraining) force on the hatch 310 which biases or "pre-loads" the hatch 310 into the fully closed position and releasably secures an inserted jack plug 400.

Example sliding mechanisms and biasing mechanisms have been described above. Other sliding mechanisms and/or biasing mechanisms may be used in other embodiments to provide the same or similar movement of the jack socket 240 in response to the insertion and removal of a jack plug 400 in other embodiments.

The present disclosure provides a concealed jack socket 240 which can be extended (or exposed) when in use and retracted (or hidden) when not is use. This may be convenient for many users since the jack socket is only presented when required. This may also protect the jack socket from foreign objects and dirt. Additionally, the local area surrounding the jack socket is chamfered, tapered or rounded providing a more streamlined device profile. This also avoids a hard corner at the edge of the portable electronic device 100 protecting users and objects from abrasion.

The present disclosure may be embodied in other specific forms without departing from its spirit or essential characteristics. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A portable electronic device comprising:
a housing including a main body and a hatch pivotably connected to the main body, wherein the hatch is moveable between a fully open position and a fully closed position, wherein the hatch has a flared portion which defines an opening for receiving and catching a tip of a jack plug during insertion of the jack plug when the hatch is in the fully closed position;
a jack socket received within the housing, the jack socket defining a cavity for receiving the jack plug;
a main circuit board;
a flexible print circuit board connecting the jack socket to the main circuit board;
wherein the hatch is pivotably connected to the main body such that, when the jack plug is inserted into the jack socket, the tip of the jack plug catches the flared portion and the tip causes the hatch to move from the fully closed position towards the fully open position, wherein continued insertion of the jack plug causes the hatch to move to the fully open position, and wherein the hatch is pivotably connected to the main body to move from the fully open position to the fully closed position in response to removal of the jack plug from the jack socket, wherein the jack socket is hidden in the fully closed position and exposed in the fully open position.

2. The portable electronic device of claim 1 comprising a hinge pivotably connecting the hatch to the main body such that the hatch rotates between the fully open position and fully closed position in response to insertion of the jack plug.

3. The portable electronic device of claim 2 wherein the jack socket is attached to an inside surface of the hatch for movement with the hatch between the fully open position and fully closed position.

4. The portable electronic device of claim 1 wherein the hatch is pivotably and slideably connected to the main body for rotation between the fully closed position and a first open position and sliding movement between the first open position and the fully open position, wherein the jack socket is moveable between a fully retracted position when the hatch is in the first open position and a fully extended position when the hatch is in the fully open position.

5. The portable electronic device of claim 4 comprising a sliding mechanism connected to the hatch for sliding the hatch between the first open position and the fully open position.

6. The portable electronic device of claim 5 further comprising a linkage system connecting the hatch and the jack socket such that the jack socket moves between the fully retracted position when the hatch is in the first open position and the fully extended position when the hatch is in the fully open position.

7. The portable electronic device of claim 5 further comprising a cable connecting the hatch and the jack socket such that the jack socket moves between the fully retracted position when the hatch is in the first open position and the fully extended position when the hatch is in the fully open position.

8. The portable electronic device of claim 4 further comprising a motor connected between a fixed point of the portable electronic device and the jack socket, the motor being adapted to move the jack socket from the fully retracted position to the fully extended position during insertion of the jack plug into the jack socket, and move the jack socket from the fully extended position to the fully retracted position during removal of the jack plug from the jack socket.

9. The portable electronic device of claim 8 further comprising a switching mechanism adapt to cause the motor to move the jack socket from the fully retracted position to the fully extended position during insertion of the jack plug into the jack socket, and cause the motor to move the jack socket from the fully extended position to the fully retracted position during removal of the jack plug from the jack socket.

10. The portable electronic device of claim 4 further comprising a first biasing mechanism for urging the jack socket into the fully extended position.

11. The portable electronic device of claim 4 further comprising a second biasing mechanism for urging the hatch into the fully closed position.

12. The portable electronic device of claim 4 further comprising:
- a first biasing mechanism for urging the jack socket into the fully extended position;
- a second biasing mechanism for urging the hatch into the fully closed position;
- a switching mechanism adapt to engage the first biasing mechanism to urge the jack socket from the fully retracted position to the fully extended position and disengage the second biasing mechanism during insertion of the jack plug into the jack socket, the switching mechanism being further adapted to engage the second biasing mechanism to urge the hatch into the fully closed position and disengage the first biasing mechanism during removal of the jack plug from the jack socket.

13. The portable electronic device of claim 4 further comprising:
- the main circuit board having a spring contact located on the main circuit board for engaging an electrical contact of the jack socket when the jack socket is in the fully extended position.

14. The portable electronic device of claim 1 wherein the main body and the hatch of the housing are formed of a flexible material.

15. The portable electronic device of claim 1 further comprising a flexible casing formed of a flexible material which overlays the housing.

16. The portable electronic device in claim 15 wherein the flexible casing applies an inwardly biasing force on the hatch.

* * * * *